(12) United States Patent
Pradun et al.

(10) Patent No.: US 11,486,291 B2
(45) Date of Patent: Nov. 1, 2022

(54) VIRTUAL SENSING SYSTEM

(71) Applicant: Watlow Electric Manufacturing Company, St. Louis, MO (US)

(72) Inventors: James N. Pradun, Lake Geneva, WI (US); Sanhong Zhang, Ballwin, MO (US); Jeremy J. Quandt, Winona, MN (US); David P. Culbertson, Bristol, WI (US); Magdi Khair, San Antonio, TX (US)

(73) Assignee: WATLOW ELECTRIC MANUFACTURING COMPANY, St. Louis, MO (US)

(*) Notice: Subject to any disclaimer, the term of this patent is extended or adjusted under 35 U.S.C. 154(b) by 0 days.

(21) Appl. No.: 16/989,217

(22) Filed: Aug. 10, 2020

(65) Prior Publication Data

US 2020/0370461 A1    Nov. 26, 2020

Related U.S. Application Data

(60) Continuation of application No. 16/710,119, filed on Dec. 11, 2019, which is a division of application No. (Continued)

(51) Int. Cl.
*F01N 9/00* (2006.01)
*F01N 11/00* (2006.01)
(Continued)

(52) U.S. Cl.
CPC ............ *F01N 9/005* (2013.01); *F01N 3/023* (2013.01); *F01N 3/027* (2013.01); *F01N 3/2006* (2013.01);
(Continued)

(58) Field of Classification Search
CPC .......... F01N 3/2066; F01N 9/00; F01N 9/005; F02D 2041/1433; F02D 2041/228; F02D 41/22; F02D 41/222; G07C 5/0808
See application file for complete search history.

(56) References Cited

U.S. PATENT DOCUMENTS

| 5,319,929 A | 6/1994 | Cornelison et al. |
| 5,444,976 A | 8/1995 | Gonze et al. |

(Continued)

FOREIGN PATENT DOCUMENTS

| CN | 1946918 | 4/2007 |
| CN | 101392673 | 3/2009 |

(Continued)

OTHER PUBLICATIONS

International Search Report for International Application PCT/US2020/015412, dated Apr. 23, 2020.
(Continued)

*Primary Examiner* — Hung Q Nguyen
*Assistant Examiner* — Mark L. Greene
(74) *Attorney, Agent, or Firm* — Burris Law, PLLC (57) ABSTRACT

A heating system includes at least one electric heater disposed within the fluid flow system. A control device includes a microprocessor and is configured to determine a temperature of the at least one electric heater based on a model and at least one input from the fluid flow system. The control device is configured to provide power to the at least one electric heater based on the temperature of the at least one electric heater.

27 Claims, 4 Drawing Sheets

Related U.S. Application Data

15/447,942, filed on Mar. 2, 2017, now Pat. No. 10,544,722.

(60) Provisional application No. 62/302,482, filed on Mar. 2, 2016.

(51) Int. Cl.

| | | |
|---|---|---|
| *F01N 3/027* | (2006.01) | |
| *G01F 1/68* | (2006.01) | |
| *H05B 1/02* | (2006.01) | |
| *F01N 13/00* | (2010.01) | |
| *F02D 41/02* | (2006.01) | |
| *F02D 41/14* | (2006.01) | |
| *G05D 23/185* | (2006.01) | |
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G01K 7/16* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *H05B 3/18* | (2006.01) | |
| *H05B 3/00* | (2006.01) | |
| *F01N 3/023* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC ............ *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(56) References Cited

U.S. PATENT DOCUMENTS

| | | | |
|---|---|---|---|
| 5,716,586 A | 2/1998 | Taniguchi | |
| 7,047,728 B2* | 5/2006 | Yasui | F02D 41/1473 |
| | | | 73/114.69 |
| 7,101,816 B2 | 9/2006 | Kaushal et al. | |
| 7,337,772 B2* | 3/2008 | Yasui | G05D 23/2401 |
| | | | 123/672 |
| 9,175,590 B2 | 11/2015 | Umemoto et al. | |
| 10,544,722 B2* | 1/2020 | Pradun | F01N 3/2013 |
| 11,035,821 B2* | 6/2021 | Toudou | G01N 27/41 |
| 2003/0187568 A1 | 10/2003 | Yasui et al. | |
| 2008/0307774 A1 | 12/2008 | Gonze et al. | |
| 2008/0314027 A1 | 12/2008 | Barber et al. | |
| 2009/0113883 A1 | 5/2009 | Bhatia et al. | |
| 2010/0287912 A1 | 11/2010 | Gonze et al. | |
| 2011/0078999 A1 | 4/2011 | Gonze et al. | |
| 2011/0131954 A1 | 6/2011 | Parnin | |
| 2012/0167554 A1 | 7/2012 | Zhang et al. | |
| 2013/0239554 A1 | 9/2013 | Gonze et al. | |
| 2017/0256104 A1 | 9/2017 | Pradun et al. | |
| 2018/0031518 A1* | 2/2018 | Kimata | G01N 27/409 |
| 2021/0190380 A1* | 6/2021 | Everly | F24H 9/2028 |

FOREIGN PATENT DOCUMENTS

| | | |
|---|---|---|
| CN | 101886567 | 11/2010 |
| CN | 102251837 | 11/2011 |
| CN | 102105210 | 12/2013 |
| CN | 105658919 | 7/2018 |
| CN | 108625953 | 1/2020 |
| DE | 102008044736 A1 | 3/2009 |
| EP | 0456919 | 11/1991 |
| EP | 0778400 B1 | 8/2000 |
| EP | 2668381 | 12/2013 |
| EP | 2626528 | 10/2016 |
| FR | 3057020 | 4/2018 |
| JP | H04219413 | 8/1992 |
| TW | 200736494 | 10/2007 |
| TW | I366625 | 6/2012 |
| WO | 2014176585 A1 | 10/2014 |

OTHER PUBLICATIONS

European Search Report and Written Opinion issued in corresponding EP Application No. 22153261, dated Apr. 26, 2022, 6 pages.

* cited by examiner

*PRIOR ART*

VIRTUAL SENSING SYSTEM

CROSS-REFERENCE TO RELATED APPLICATIONS

This application is a continuation of U.S. patent application Ser. No. 16/710,119, filed on Dec. 19, 2019, which is a divisional of U.S. patent application Ser. No. 15/447,942, now U.S. Pat. No. 10,544,722, filed on Mar. 2, 2017, which claims priority to and the benefit of U.S. Provisional Patent Application No. 62/302,482, filed on Mar. 2, 2016. The disclosures of the above applications are incorporated herein by reference. This application is also related to co-pending applications U.S. patent application Ser. No. 15/448,044, filed Mar. 2, 2017 and titled "System and Method for Axial Zoning of Heating Power"; U.S. patent application Ser. No. 15/447,964, filed Mar. 2, 2017 and titled "Heater Element As Sensor for Temperature Control in Transient Systems"; U.S. patent application Ser. No. 15/447,994, filed Mar. 2, 2017 and titled "Heater Element Having Targeted Decreasing Temperature Resistance Characteristics"; U.S. patent application Ser. No. 15/448,068, filed Mar. 2, 2017 and titled "Dual-Purpose Heater and Fluid Flow Measurement System"; U.S. patent application Ser. No. 15/448,162, filed Mar. 2, 2017 and titled "Heater-Actuated Flow Bypass"; U.S. patent application Ser. No. 15/448,108, filed Mar. 2, 2017 and titled "Susceptor for Use in a Fluid Flow System"; U.S. patent application Ser. No. 15/448,130, filed Mar. 2, 2017 and titled "Thermal Storage Device for Use in a Fluid Flow System"; and U.S. patent application Ser. No. 15/448,186, filed Mar. 2, 2017 and titled "Bare Heating Elements for Heating Fluid Flows," the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various aftertreatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to avoid failure of any of the heating elements. Therefore, the heating elements that are under the less harsh heating conditions are typically operated to generate a heat output that is much below their maximum available heat output.

SUMMARY

This section provides a general summary of the disclosure and is not a comprehensive disclosure of its full scope or all of its features.

The present disclosure provides for a heating system for a fluid flow system. The heating system includes at least one electric heater disposed within the fluid flow system. A control device includes a microprocessor and is configured to determine a temperature of the at least one electric heater based on a model and at least one input from the fluid flow system. The control device is configured to provide power to the at least one electric heater based on the temperature of the at least one electric heater.

In one form of the present disclosure, the electric heater is selected from the group consisting of a band heater, a bare wire resistive heating element, a cable heater, a cartridge heater, a layered heater, a strip heater, and a tubular heater.

In one form of the present disclosure, the temperature of the at least one electric heater is a sheath temperature.

In one form of the present disclosure, the at least one input includes at least one of a set point, a mass flow rate, an inlet temperature, and radiation effects.

In one form of the present disclosure, the mass flow rate is determined based on at least one of a torque demand, a pedal position, a manifold absolute pressure (MAP), a boost timing, an engine timing, a fuel consumption, and an inlet air mass flow rate.

In one form of the present disclosure, the model includes at least one physical characteristic of the heating system, and the at least one physical characteristic are selected from the group consisting of resistance wire diameter, heater insulation thickness, heater sheath thickness, conductivity, specific heat and density of the material of the heater, heat transfer coefficients, emissivity of the heater and exhaust fluid flow pathway, and combinations thereof.

In one form of the present disclosure, an engine system includes the heating system for a fluid flow system. The heating system includes at least one electric heater disposed within the fluid flow system. A control device includes a microprocessor and is configured to determine a temperature of the at least one electric heater based on a model and at least one input. The at least one input is from the fluid flow system. The control device is configured to provide power to the at least one electric heater based on the temperature of the at least one electric heater.

In one form of the present disclosure, the control device is configured to receive engine inputs that include engine parameters, fluid flow parameters, electrical power output, heater parameters, or a combination thereof, and the control device is configured to generate an output that includes a power consumption, a fluid flow temperature, a heater temperature, a diagnostic, a fluid flow mass flow rate, or combination thereof.

In one form of the present disclosure, the heating system is configured to diagnose degrading engine system components.

In one form of the present disclosure, the heating system is in communication with an engine control unit and configured to trigger a diagnostic trouble code when a determined parameter is mismatched with a preset parameter.

In one form of the present disclosure, the at least one electric heater includes a resistive heating element.

In one form of the present disclosure, the at least one input includes a mass flow rate of the fluid flow, a mass velocity of the fluid flow, a flow temperature upstream of the at least one electric heater, a flow temperature downstream of the at least one electric heater, a power input to the at least one electric heater, parameters derived from physical characteristics of the heating system, or a combination thereof.

In one form of the present disclosure, the temperature of the at least one heater is a sheath temperature. The control device is configured to determine the sheath temperature based on the following equation $$T_s = T_{out} + \frac{\left(\frac{kW}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T-D}\right)\left(\frac{M_{in}+M_{fuel}}{A_c}\right)\right]^m}\right\}}$$

where:
Ac is a heater cross-sectional area,
As is a sheath area,
C is a first constant based on Reynolds number,
$C_2$ is an offset based on number of heater elements,
D is a heater element diameter,
K is a thermal conductivity of air,
kW is a total heater power,
$M_{fuel}$ is a mass flow rate of fuel,
$M_{in}$ is inlet mass air flow rate,
m is a second constant based on Reynolds number,
$P_r$ is Prandtl number of air taken at gas temperature,
$Pr_s$ is a Prandtl number of air taken at sheath temperature;
$S_T$ is a transverse distance between elements,
$T_{out}$ is a heater outlet temperature, and
μ is a viscosity of air.

In one form of the present disclosure, the temperature of the at least one heater is a sheath temperature. The control device is configured to determine the sheath temperature based on the following equation $$T_s = \frac{T_{out}+T_{in}}{2} + \frac{\left(\frac{C_P \cdot \dot{m}(T_{out}+T_{in})}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T-D}\right)\left(\frac{M_{in}+M_{fuel}}{A_c}\right)\right]^m}\right\}}$$

where,
Ac is a heater cross-sectional area,
As is a sheath area,
C is a constant based on Reynolds number,
$C_2$ is an offset based on number of heater elements,
$C_p$ is a specific heat of air at constant pressure,
D is a heater element diameter,
K is a thermal conductivity of air,
$M_{fuel}$ is a mass flow rate of fuel,
$M_{in}$ is a inlet mass air flow (MAF) rate,
m is a constant based on Reynolds number,
$\dot{m}$ is a mass flow rate,
Pr is a Prandtl number of air taken at gas temperature,
$Pr_s$ is a Prandtl number of air taken at sheath temperature,
$S_T$ is a transverse distance between elements,
$T_{in}$ is a heater inlet temperature,
$T_{out}$ is a heater outlet temperature, and
μ is a viscosity of air.

The present disclosure also provides a heating system including at least one electric heater disposed within a fluid flow pathway. The heating system includes a control device including a microprocessor and configured to receive at least one input. The at least one input includes at least one of a mass flow rate of the fluid flow system, a fluid inlet temperature, an outlet temperature, or combination thereof. The control device is configured to determine a temperature of the at least one electric heater based on a model and the at least one input. The control device is configured to provide power to the at least one electric heater based on the temperature of the at least one electric heater.

In one form of the present disclosure, the temperature of the at least one heater is a sheath temperature. The control device is configured to determine the sheath temperature based on the following equation:

$$T_s = T_{out} + \frac{\left(\frac{kW}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T - D}\right)\left(\frac{M_{in} + M_{fuel}}{A_c}\right)\right]^m}\right\}}$$

where:

Ac is a heater cross-sectional area,
As is sheath area,
C is a first constant based on Reynolds number,
$C_2$ is an offset based on number of heater elements,
D is a heater element diameter,
K is a thermal conductivity of air,
kW is a total heater power,
$M_{fuel}$ is a mass flow rate of fuel,
$M_{in}$ is inlet mass air flow rate,
m is a second constant based on Reynolds number,
$P_r$ is Prandtl number of air taken at gas temperature,
$Pr_s$ is a Prandtl number of air taken at sheath temperature;
$S_T$ is a transverse distance between elements,
$T_{out}$ is a heater outlet temperature, and
μ is a viscosity of air.

In one form of the present disclosure, the temperature of the at least one heater is a sheath temperature, and the control device is configured to determine the sheath temperature based on the following equation $$T_s = \frac{T_{out} + T_{in}}{2} + \frac{\left(\frac{C_P \cdot \dot{m}(T_{out} + T_{in})}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T - D}\right)\left(\frac{M_{in} + M_{fuel}}{A_c}\right)\right]^m}\right\}}$$

where,

Ac is a heater cross-sectional area,
As is a sheath area,
C is a constant based on Reynolds number,
$C_2$ is an offset based on number of heater elements,
$C_p$ is a specific heat of air at constant pressure,
D is a heater element diameter,
K is a thermal conductivity of air,
$M_{fuel}$ is a mass flow rate of fuel,
$M_{in}$ is a inlet mass air flow (MAF) rate,
m is a constant based on Reynolds number,
$\dot{m}$ is a mass flow rate,
Pr is a Prandtl number of air taken at gas temperature,
$Pr_s$ is a Prandtl number of air taken at sheath temperature,
$S_T$ is a transverse distance between elements,
$T_{in}$ is a heater inlet temperature,
$T_{out}$ is a heater outlet temperature, and
μ is a viscosity of air.

In one form of the present disclosure, the temperature of the at least one heater is an outlet temperature, and the control device is configured to determine the outlet temperature based on the following equation $$T_{out,1} = \frac{2 \cdot \dot{m} \cdot C_P \cdot T_{in,1} + h \cdot A_s(2T_s - T_{in,1})}{2 \cdot \dot{m} \cdot C_P + h \cdot A_s}$$

where:

$A_s$ is a sheath surface area;
$C_p$ is a specific heat of air at constant pressure;
h is a convective heat transfer coefficient;
$\dot{m}$ is a mass flow rate;
$T_{out,1}$ is outlet temperature after the first component;
$T_{in,1}$ is an inlet temperature of at the first component; and
$T_s$ is a sheath temperature.

In one form of the present disclosure, the at least one electric heater is one of a band heater, a bare wire resistive heating element, a cable heater, a cartridge heater, a layered heater, a strip heater, and a tubular heater.

In one form of the present disclosure, the at least one input includes at least one of a set point and radiation effects.

In one form of the present disclosure, the mass flow rate of the fluid flow system is determined based on at least one of a torque demand, a pedal position, a manifold absolute pressure (MAP), a boost timing, an engine timing, a fuel consumption, and an inlet air mass flow rate.

In one form of the present disclosure, the model includes at least one physical characteristic of the heating system, and the at least one physical characteristic are selected from the group consisting of resistance wire diameter, heater insulation thickness, heater sheath thickness, conductivity, specific heat and density of the material of the heater, heat transfer coefficients, emissivity of the heater and exhaust fluid flow pathway, and combinations thereof.

In one form of the present disclosure, an engine system includes the heating system.

In one form of the present disclosure, the control device is configured to receive engine inputs that include engine parameters, fluid flow parameters, electrical power output, heater parameters, or a combination thereof, and the control device is configured to generate an output that includes a power consumption, a fluid flow temperature, a heater temperature, a diagnostic, or combination thereof.

In one form of the present disclosure, the heating system is configured to diagnose degrading engine system components.

In one form of the present disclosure, the heating system is in communication with an engine control unit and configured to trigger a diagnostic trouble code when a determined parameter is mismatched with a preset parameter.

In one form of the present disclosure, the at least one electric heater includes a resistive heating element.

In one form of the present disclosure, the at least one input includes, a mass velocity of the fluid flow, a flow temperature upstream of the at least one electric heater, a flow temperature downstream of the at least one electric heater, a power input to the at least one electric heater, parameters derived from physical characteristics of the heating system, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
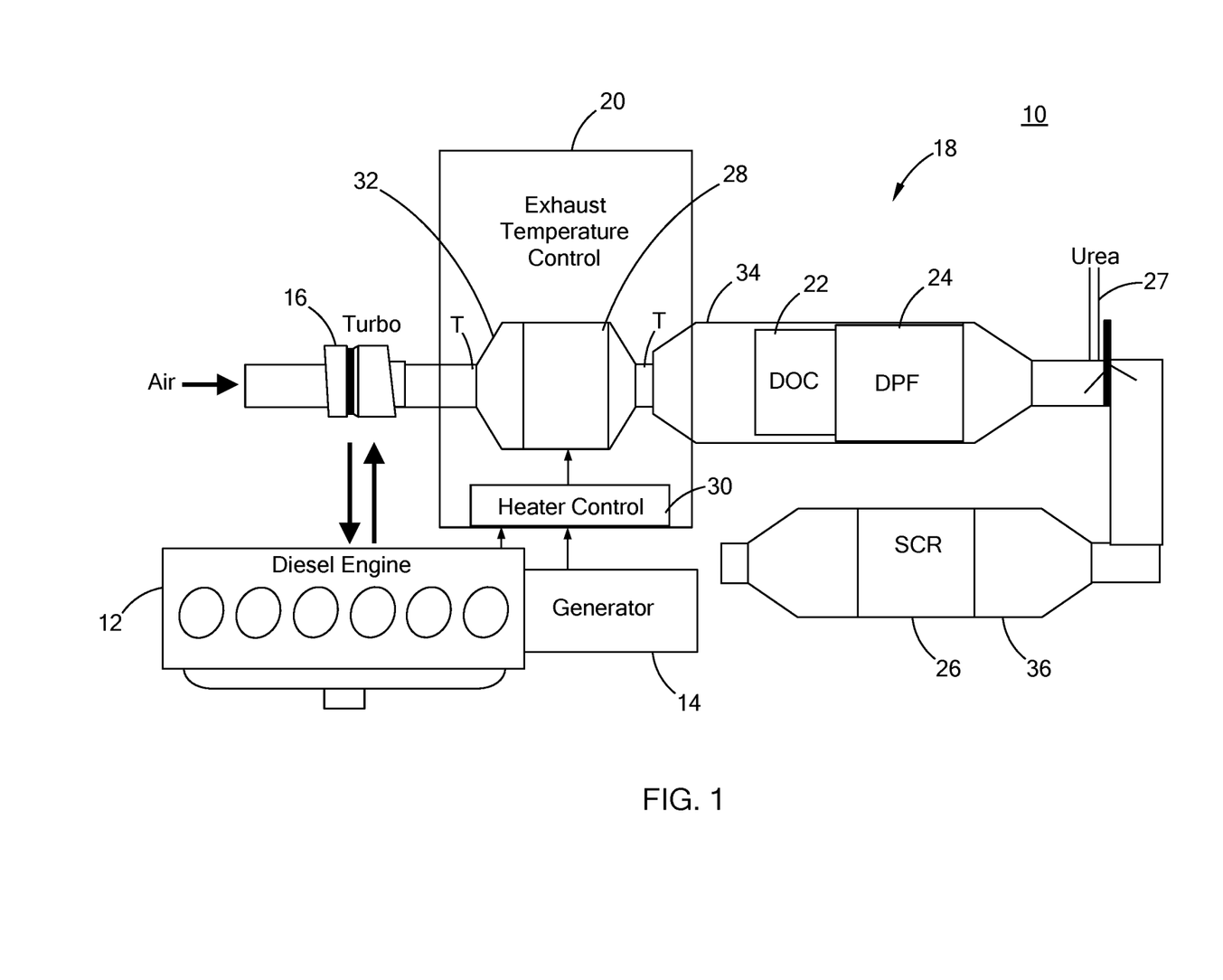
FIG. 1 is a schematic view of a diesel engine and exhaust aftertreatment system in which the principles of the present disclosure are applied.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from a turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, exhaust aftertreatment system 18 includes a heating system 20, a diesel oxidation catalyst (DOC) 22, a diesel particulate filter device (DPF) 24, and a selective catalytic reduction device (SCR) 26. The exhaust aftertreatment system 18 includes an upstream exhaust conduit 32 that receives a heater assembly 28 therein, an intermediate exhaust conduit 34 in which the DOC 22 and DPF 24 are provided, and a downstream exhaust conduit 36 in which the SCR 26 is disposed.

It should be understood that the engine system 10 illustrated and described herein is merely exemplary, and thus other components such as a $NO_x$ adsorber or ammonia oxidation catalyst, among others, may be included, while other components such as the DOC 22, DPF 24, and SCR may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

The heating system 20 includes a heater assembly 28 disposed upstream from the DOC 22, and a heater control module 30 for controlling operation of the heater assembly 28. Heater assembly 28 can include one or more electric heaters wherein each electric heater includes at least one resistive heating element. The heater assembly 28 is disposed within an exhaust fluid flow pathway in order to heat the fluid flow during operation. Heater control module 30 typically includes a control device adapted to receive input from the heater assembly 28. Examples of controlling the operation of heater assembly 28 can include turning the heater assembly on and off, modulating power to the heater assembly 28 as a single unit and/or modulating power to separate subcomponents, such as individual or groups of resistive heating elements, if available, and combinations thereof.

In one form, the heater control module 30 includes a control device. The control device is in communication with at least one electric heater of the heater assembly 28. The control device is adapted to receive at least one input including but not limited to an exhaust fluid flow, mass velocity of an exhaust fluid flow, flow temperature upstream of the at least one electric heater, flow temperature downstream of the at least one electric heater, power input to the at least one electric heater, parameters derived from physical characteristics of the heating system, and combinations thereof. The at least one electric heater can be any heater suitable to heat an exhaust fluid. Example electric heaters include but are not limited to a band heater, a bare wire resistive heating element, a cable heater, a cartridge heater, a layered heater, a strip heater, a tubular heater, and combinations thereof. The physical characteristics may include, by way of example, resistance wire diameter, MgO (insulation) thickness, sheath thickness, conductivity, specific heat and density of the materials of construction, heat transfer coefficient, and emissivity of the heater and fluid conduit, among other geometrical and application related information.

The system of FIG. 1 includes the DOC 22 disposed downstream from the heater assembly 28. The DOC 22 serves as a catalyst to oxidize carbon monoxide and any unburnt hydrocarbons in the exhaust gas. In addition, the DOC 22 converts nitric oxide (NO) into nitrogen dioxide ($NO_2$). The DPF 24 is disposed downstream from the DOC 22 to assist in removing diesel particulate matter (PM) or soot from the exhaust gas. The SCR 26 is disposed downstream from the DPF 24 and, with the aid of a catalyst, converts nitrogen oxides ($NO_x$) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 26, $NO_x$ is reduced into $N_2$, $H_2O$ and $CO_2$.

In one form of the present disclosure, data from the engine system 10 described above is used in a mathematical model to predict various temperatures, including heater temperature, exhaust inlet temperature, and exhaust outlet temperature, among others, without the use of physical sensors. These models have been developed for both transient and non-transient systems and are applicable to a variety of heater types and fluid flow applications. Accordingly, the various forms provided herein of a tubular heater and an engine exhaust should not be construed as limiting the scope of the present disclosure. Further, the specific reference to a "heater sheath" temperature is merely exemplary and the calculated temperature may be for any component of any type of heater such as a band heater, a bare wire resistive heating element, a cable heater, a cartridge heater, a layered heater, a strip heater, or a tubular heater, among others. A "layered heater" has been previously defined in U.S. Pat. No. 7,196,295, which is commonly assigned with the present application and the contents of which are incorporated herein by reference in their entirety.

Figure 2:
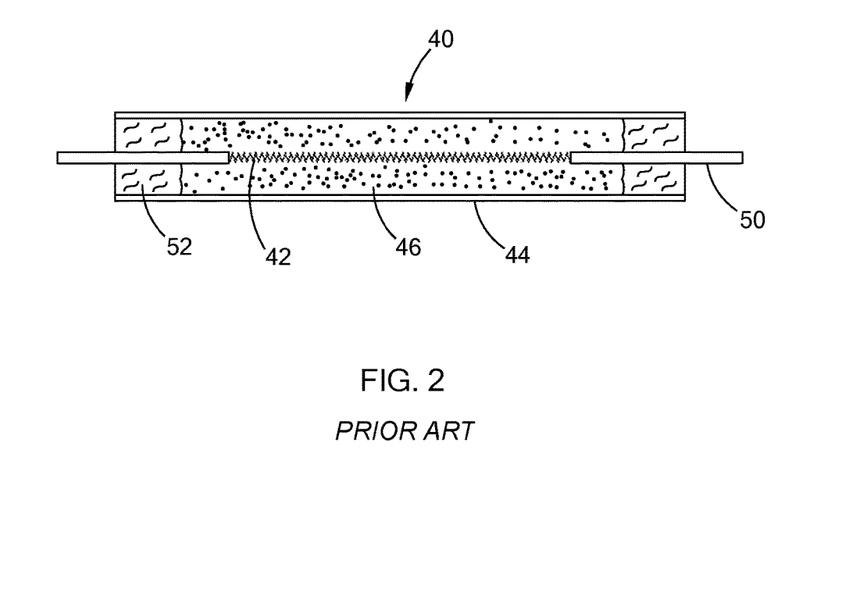
FIG. 2 is a cross-sectional view of a tubular heater construction according to the prior art.

Referring to FIG. 2, a tubular heater is used as an example type of heater used in the heater assembly 28 and is illustrated and generally indicated by reference numeral 40. The tubular heater 40 comprises a resistive heating element 42 disposed within a sheath 44, and an insulation material 46 disposed therebetween, such as by way of example, a compacted magnesium oxide (MgO). The tubular heater 40 also may include power pins 50 and seals 52.

The present disclosure provides for a control system and methods of controlling an electric heater that generally include a device/apparatus that uses inputs, such as mass flow or flow velocity, flow temperature either upstream or downstream of the heater, heater power input, and parameters derived from physical characteristics of the system, to then modulate power to the heater based on these inputs. In order to calculate values for the system depending on a set of known variables, a variety of equations are disclosed herein. It should be understood that these equations are merely exemplary and should not be construed as limiting the scope of the present disclosure.

For example, in order to calculate the temperature of the sheath 44 without the use of physical sensors in an application such as a diesel exhaust as set forth above, mass flow rate, inlet temperature, and power to the heater 40 are used, along with heat transfer equations, for a variety of heater configurations. In one form, Equation 1 below is used to calculate the temperature of the sheath 44 ($T_s$):

$$T_s = T_{out} + \frac{\left(\frac{kW}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T - D}\right)\left(\frac{M_{in} + M_{fuel}}{A_c}\right)\right]^m}\right\}} \quad \text{EQUATION 1}$$

where:
Ac=heater cross-sectional area;
As=sheath area;
C=a first constant based on Reynolds number (Re) and Table 1 shown below;
$C_2$=offset based on number of heater elements;
D=heater element diameter;
K=thermal conductivity of air;
kW=total heater power;
$M_{fuel}$=mass flow rate of fuel;
$M_{in}$=inlet mass air flow (MAF) rate;
m=a second constant based on Reynolds number (Re) and Table 1 shown below;
$P_r$=Prandtl number of air taken at gas temperature;
$Pr_s$=Prandtl number of air taken at sheath temperature;
$S_T$=transverse distance between elements;
$T_{out}$=heater outlet temperature; and
μ=viscosity of air.

TABLE 1

| | $Re_{D, max}$ | | C ("$C_1$") | | m | |
|---|---|---|---|---|---|---|
| | 10-100 | | 0.80 | | 0.40 | |
| | 100-1000 | | (Single cylinder approx.) | | (Single cylinder approx.) | |
| | 1000-200k | | 0.27 | | 0.63 | |
| Single Cylinder | 40-4000 | | 0.683 | | 0.466 | |
| $N_L$ | 1 | 2 | 3 | 4 | 5 | 6 |
| $C_2$ | 0.70 | 0.80 | 0.86 | 0.89 | 0.90 | 0.92 |

$Re_{D,max}$=Reynolds number for a given diameter and velocity maximum;
$N_L$=Number of elements; and
$C_2$=When evaluating element 1, use $N_L$=1; when evaluating 6 elements, $N_L$ starts at 0.7 and increases to 0.92 as each element is analyzed.

Further, in this Equation 1, radiation effects have not been incorporated, however, may be incorporated while remaining within the scope of the present disclosure.

Figure 3:
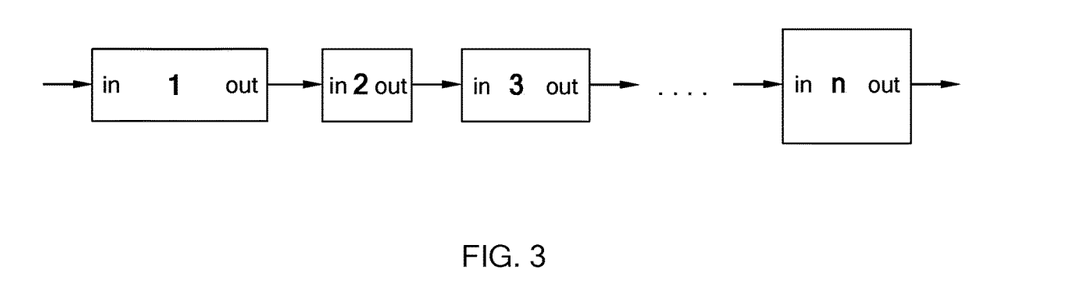
FIG. 3 is a schematic diagram illustrating a series of components in a fluid flow system according to the teachings of the present disclosure.

In addition to heater sheath 44 temperature, an outlet temperature after each element within the fluid flow stream (see FIG. 3) can be calculated/modeled, thus reducing the need for additional temperature sensors. In one form, the outlet temperature is calculated according to Equation 2 below:

$$T_{out,1} = \frac{2 \cdot \dot{m} \cdot C_P \cdot T_{in,1} + h \cdot A_s(2T_s - T_{in,1})}{2 \cdot \dot{m} \cdot C_P + h \cdot A_s} \quad \text{EQUATION 2}$$

where:
$A_s$=sheath surface area;
$C_p$=specific heat of air at constant pressure;
h=convective heat transfer coefficient;
$\dot{m}$=mass flow rate;
$T_{out,1}$=outlet temperature after heating element 1;
$T_{in,1}$=inlet temperature of heating element 1; and
$T_s$=sheath temperature.

Therefore, using Equation 2, temperatures can be predicted without the use of physical sensors throughout a fluid flow system. As a further advantage, using the equations as set forth herein results in a quicker response time due to the lag time associated with physical sensors, and especially in transient systems. Better accuracy and quicker response times also allows for using heaters that operate at higher temperatures, therefore providing improved performance and decreasing safety margins. Moreover, a failure mode of a physical sensor is removed by the present disclosure.

Because Equation 1 is for steady state, a further underlying equation is used for virtual sensing as disclosed herein, namely, Equation 3:

$$T_s = \frac{T_{out} + T_{in}}{2} + \frac{\left(\frac{C_P \cdot \dot{m}(T_{out} + T_{in})}{A_s}\right)}{\frac{K}{D}\left\{\frac{C_2 \cdot C \cdot Pr^{0.36}\left(\frac{Pr}{Pr_s}\right)^{0.25}}{\left[\frac{D}{\mu}\left(\frac{S_T}{S_T - D}\right)\right]^m \left(\frac{M_{in} + M_{fuel}}{A_c}\right)}\right\}} \quad \text{EQUATION 3}$$

where:
Ac=heater cross-sectional area;
As=sheath area;
C=constant based on Reynolds number (Re) and Table 1;
$C_2$=offset based on number of heater elements;
$C_p$=specific heat of air at constant pressure;
D=heater element diameter;
K=thermal conductivity of air;
$M_{fuel}$=mass flow rate of fuel;
$M_{in}$=inlet mass air flow (MAF) rate;
m=constant based on Reynolds number (Re) and Table 1;
$\dot{m}$=mass flow rate;
$P_r$=Prandtl number of air taken at gas temperature;
$Pr_s$=Prandtl number of air taken at sheath temperature;
$S_T$=transverse distance between elements;

$T_{in}$ = heater inlet temperature;
$T_{out}$ = heater outlet temperature; and
μ viscosity of air.

Generally, so as to not be limited to the specific equations disclosed herein, $T_s$ is determined by a system of equations using inputs of set point, mass flow, and inlet temperature to calculate system temperatures.

The present disclosure further provides for predictive/proactive control of the heater 40. For example, system data such as torque demand, pedal position, and increased manifold absolute pressure (MAP)/boost/engine timing can be converted into a mass flow rate, which can then be provided to the control system to determine desired heater power in advance of when the power is needed, rather than relying on a delayed response to a physical sensor.

One variation of the present disclosure takes into account radiation effects according to Equation 4:

$$Q = \varepsilon \cdot \sigma \cdot v_f (T_h + T_{se}) \quad \text{EQUATION 4}$$

where:
Q = radiation density;
$T_h$ = absolute heater temperature;
$T_{se}$ = absolute sensor temperature;
$V_f$ = of view factor (portion of heater radiation that strikes sensor);
ε = emissivity; and
σ = Stefan-Boltzmann constant.

Furthermore, the heater can be fully mathematically quantified such that the system frequency response of all materials comprising the heater can be determined from mass air flow (MAF) rate, heater inlet temperature, and applied power. The frequency response of the heater to changing engine and exhaust conditions or general system disruptions can be reduced, allowing the heater to have a faster feedback response. This then improves control over heater element temperature, allowing the heater to have a higher watt density (watts per unit length, watts per unit area, or watts per unit volume) and better durability, as temperature fluctuations are reduced. System representations can be simplified into a form the control microprocessor can utilize with reduced effort. Further, the present disclosure can simplify a relatively complex math process into tabulated form to reduce processing power and defined expected states. It should be understood that a variety of methods of obtaining mass air flow may be employed, such as by way of example, MAP and combining inlet air mass flow with fuel consumption. Accordingly, as used herein, the term "mass flow" shall be construed to include these and other methods of obtaining mass air flow.

Generally, the present disclosure takes inputs from a variety of devices, such as by way of example, engine, exhaust, electrical power, and heater, executes various algorithms, and then generates output such as actual power consumption, exhaust temperature, heater temperature, diagnostics, and exhaust mass flow. The engine inputs/parameters may include exhaust temperature and exhaust flow; and the heater inputs/parameters may include heater power, geometry, and coefficients. The system model may include a heater model, wire temperature and sheath temperature, and at least one control algorithm. The outputs may then include exhaust temperature, exhaust flow, and diagnostics.

In still another form, the virtual sensing system functions in a diagnostic mode to compare a response of the heater 40 to a known applied power to determine if the overall exhaust aftertreatment system 18 is degrading, has reduced efficiency, or if there is a defect in the exhaust aftertreatment system 18. In addition, the virtual sensing system may allow for the removal of a catalyst inlet temperature sensor, thus reducing the cost and complexity of the overall exhaust aftertreatment system 18. If the catalyst inlet temperature sensor remains in the exhaust aftertreatment system 18, its output can be compared to the calculated/predicted heater outlet temperature provided by the virtual sensing system and any mismatch therebetween can trigger a diagnostic trouble code within an engine control unit (ECU). Furthermore, the virtual sensor system of the present disclosure can be integrated with a model-based design (e.g., Simulink®) to improve transient performance and allow better characterization of the heater system. Furthermore, a model-based design can adjust parameters/characterization of the virtual sensor system based on a specific application other than the diesel exhaust application as used herein.

The use of a virtual sensor system further reduces the uncertainty of knowing the actual resistive element (e.g., wire) temperature and allows safety margins to be reduced, increased watt density and less heater surface area, thus resulting in a more efficient and less costly heater.

The control system as disclosed herein may also control power to the heater by a calculated, or virtual temperature of the resistive heating element, such as a resistive wire. Reference is made to copending application titled "Advanced Two-Wire Heater System for Transient Systems," which has been incorporated herein by reference. In some applications such as a tubular heater, controlling by virtual wire temperature overcomes the thermal inertia of the insulation and sheath. This results in less temperature variation on the wire, which improves reliability. Such an approach also reduces the cyclic load on a power source, allowing for smoother power delivery and less strain on the power source.

The present disclosure further provides for an engine system 10 including a control system for the heating system of the exhaust system as previously described. The control device is adapted to receive engine inputs selected from the group consisting of engine parameters, exhaust parameters, electrical power output, heater parameters, and the device is operable to generate output selected from the group consisting of power consumption, exhaust temperature, heater temperature, diagnostics, exhaust mass flow rate, and combinations thereof. The control system is further operable to diagnose degrading engine system components. In this example, the control system is in communication with an engine control unit and adapted to trigger a diagnostic trouble code when a determined parameter is mismatched with a preset parameter.

Figure 4:
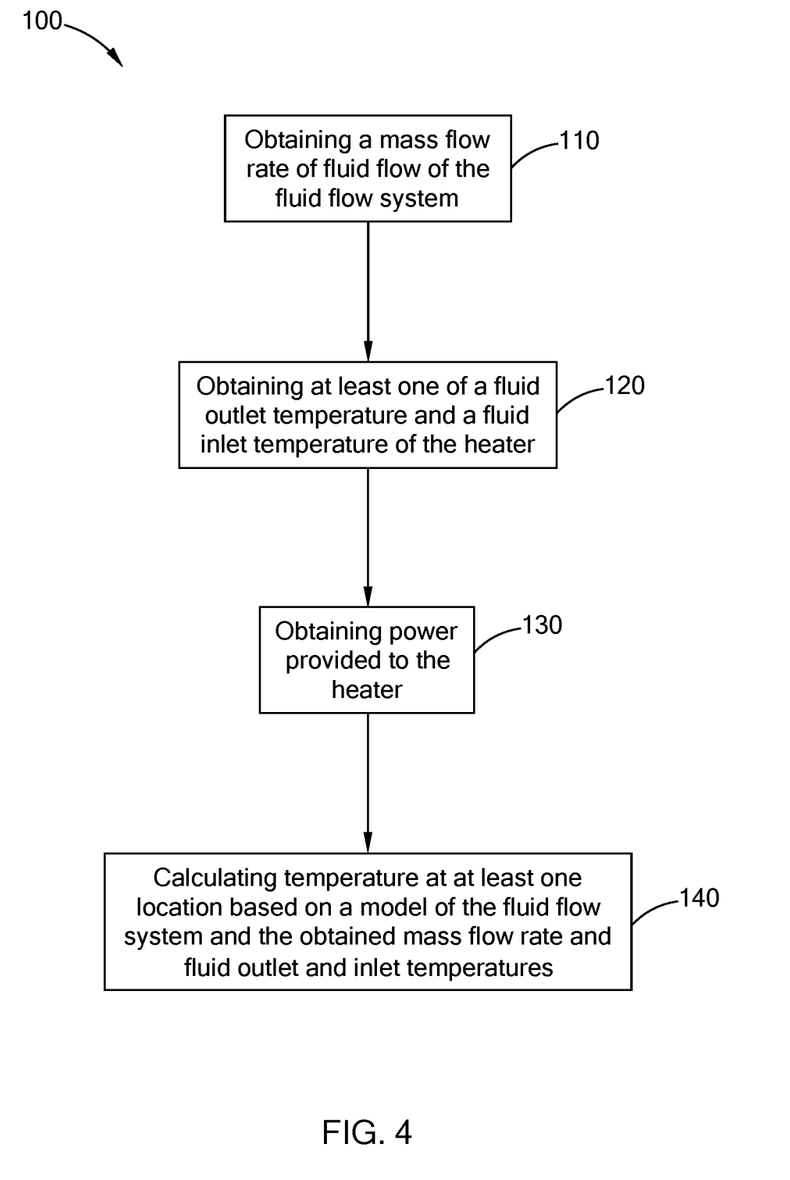
FIG. 4 is a flow diagram illustrating a method of predicting temperature of at least one location in a fluid flow system having a heater according to the teachings of the present disclosure.

Referring to FIG. 4, the present disclosure further includes a method 100 of predicting temperature of at least one location in a fluid flow system having a heater disposed in a heating system for heating fluid. The method includes obtaining a mass flow rate of fluid flow of the fluid flow system 110, obtaining at least one of a fluid outlet temperature and a fluid inlet temperature of the heater 120, obtaining power provided to the heater 130, and calculating temperature at the at least one location based on a model of the fluid flow system and the obtained mass flow rate and fluid outlet and inlet temperatures 140. The at least one location can be on a heating element of the at least one electric heater of the heating assembly. The model can include the temperature prediction models as previously described above. The process can further be integrated with a model-based design.

Figure 5:
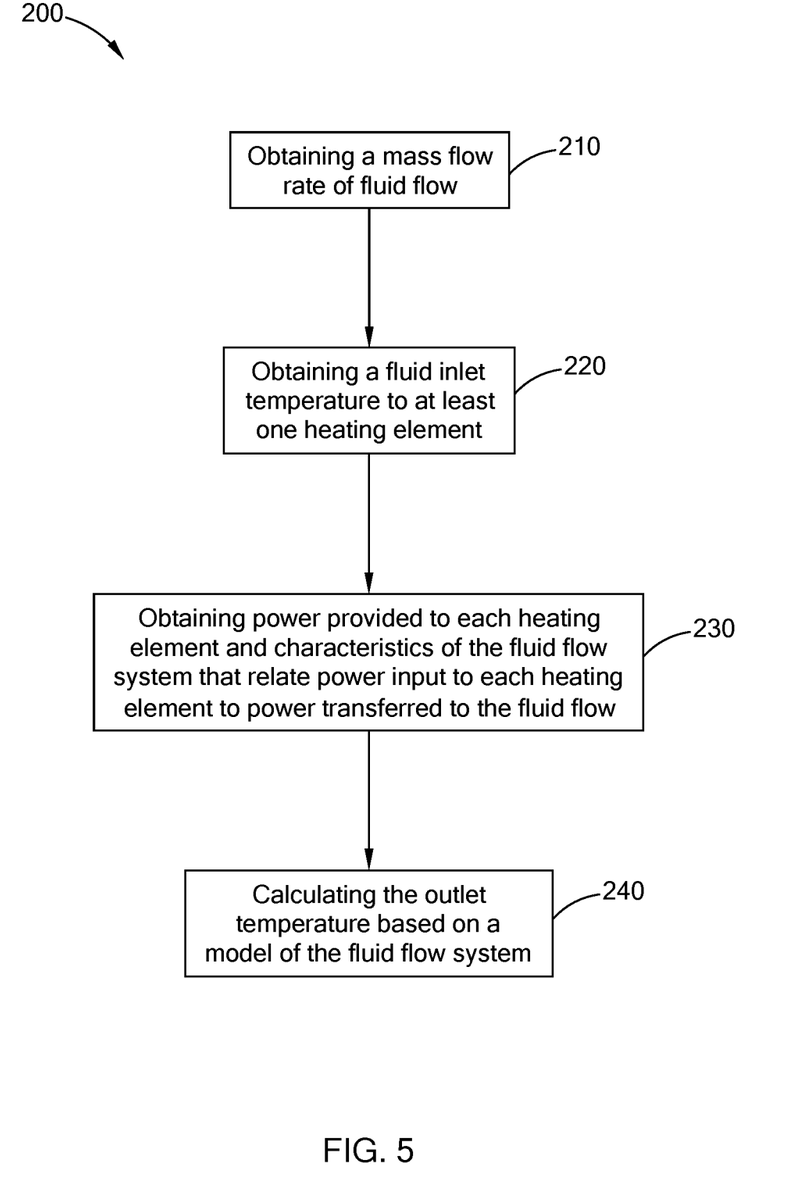
FIG. 5 is a flow diagram illustrating a method of predicting outlet temperature after each of a plurality of resistive heating elements in a heater system disposed in a fluid flow system in accordance with the teachings of the present disclosure.

Referring to FIG. 5, the present disclosure further provides another method 200 of predicting outlet temperature after each of a plurality of resistive heating elements in a heater system disposed in a fluid flow system for heating fluid. The method includes obtaining a mass flow rate of fluid flow of the fluid flow system 210, obtaining a fluid inlet temperature to at least one resistive heating element 220, obtaining power provided to each resistive heating element and characteristics of the fluid flow system that relate power input to each resistive heating element to power transferred to the fluid flow 230, and calculating the outlet temperature based on a model of the fluid flow system 240.

As used herein, the term "model" should be construed to mean an equation or set of equations, a tabulation of values representing the value of a parameter at various operating conditions, an algorithm, a computer program or a set of computer instructions, a signal conditioning device or any other device that modifies the controlled variable (e.g., power to the heater) based on predicted/projected/future conditions, wherein the prediction/projection is based on a combination of a priori and in-situ measurements.

Accordingly, a variety of different forms of heaters, sensors, control systems, and related devices and methods have been disclosed herein for use in fluid flow systems. Many of the different forms can be combined with each other and may also include additional features specific to the data, equations, and configurations as set forth herein. Such variations should be construed as falling within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heating system for a fluid flow system, the heating system comprising:
   at least one electric heater disposed within the fluid flow system; and
   a control device including a microprocessor and configured to determine a temperature of
   the at least one electric heater based on a model and at least one fluid flow system input and at least one heater input, wherein:
   the at least one fluid flow system input includes a mass flow rate of a fluid flow within a fluid flow pathway, a flow velocity of the fluid flow, a flow temperature upstream of the at least one electric heater, a flow temperature downstream of the at least one electric heater, and combinations thereof,
   the at least one heater input includes at least one physical characteristic of the heating system, the at least one physical characteristic includes a resistance wire diameter, a heater insulation thickness, a heater sheath thickness, a conductivity, a specific heat and density of the material of the heater, an emissivity of the heater and the fluid flow pathway, or combinations thereof, and
   the control device is configured to provide power to the at least one electric heater based on the temperature of the at least one electric heater.

2. The heating system according to claim 1, wherein the at least one electric heater is one of a band heater, a bare wire resistive heating element, a cable heater, a cartridge heater, a layered heater, a strip heater, and a tubular heater.

3. The heating system according to claim 1, wherein the temperature of the at least one electric heater is a sheath temperature.

4. The heating system according to claim 1, wherein the control device is configured to determine the temperature of the at least one electric heater based on the model and at least one further input including at least one of a set point, a mass flow rate, an inlet temperature, and radiation effects.

5. The heating system according to claim 4, wherein the mass flow rate is determined based on at least one of a torque demand, a pedal position, a manifold absolute pressure (MAP), a boost timing, an engine timing, a fuel consumption, and an inlet air mass flow rate.

6. The heating system according to claim 1, wherein the at least one physical characteristic further includes heat transfer coefficients.

7. An engine system comprising the heating system according to claim 1.

8. The engine system according to claim 7, wherein the control device is configured to receive engine inputs that include engine parameters, fluid flow parameters, electrical power output, heater parameters, or a combination thereof, and the control device is configured to generate an output that includes a power consumption, a fluid flow temperature, a heater temperature, a diagnostic, a fluid flow mass flow rate, or combination thereof.

9. The engine system according to claim 7, wherein the heating system is configured to diagnose degrading engine system components.

10. The engine system according to claim 7, wherein the heating system is in communication with an engine control unit and configured to trigger a diagnostic trouble code when a determined parameter is mismatched with a preset parameter.

11. The heating system according to claim 1, wherein the at least one electric heater includes a resistive heating element.

12. The heating system according to claim 1, wherein the temperature of the at least one electric heater is a sheath temperature, and wherein the control device is configured to determine the sheath temperature based on the following equation $$T_s = T_{out} + \frac{\left(\frac{kW}{A_s}\right)}{\frac{K}{D}\left\{C_2 \cdot C \cdot Pr^{0.36}\left(\frac{Pr}{Pr_s}\right)^{0.25}\left[\frac{D}{\mu}\left(\frac{S_T}{S_T - D}\right)\left(\frac{M_{in} + M_{fuel}}{A_c}\right)\right]^m\right\}}$$

where:
$A_c$ is a heater cross-sectional area,
$A_s$ is a sheath area,
C is a first constant based on Reynolds number, $C_2$ is an offset based on the number of heater elements in the at least one electric heater,
D is a heater element diameter,
K is a thermal conductivity of air,
kW is a total heater power,
$M_{fuel}$ is a mass flow rate of fuel,
$M_{in}$ is an inlet mass air flow rate,
m is a second constant based on Reynolds number,
Pr is a Prandtl number of air taken at gas temperature,
$Pr_s$ is a Prandtl number of air taken at sheath temperature;
$S_T$ is a transverse distance between heater elements,
$T_{out}$ is a heater outlet temperature, and
μ is a viscosity of air.

13. The heating system according to claim 1, wherein the temperature of the at least one electric heater is a sheath temperature, and wherein the control device is configured to determine the sheath temperature based on the following equation $$T_s = \frac{T_{out} + T_{in}}{2} + \frac{\left(\frac{C_P \cdot \dot{m}(T_{out} + T_{in})}{A_s}\right)}{\frac{K}{D}\left\{C_2 \cdot C \cdot Pr^{0.36}\left(\frac{Pr}{Pr_s}\right)^{0.25} \left[\frac{D}{\mu}\left(\frac{S_T}{S_T - D}\right)\left(\frac{M_{in} + M_{fuel}}{A_c}\right)\right]^m\right\}}$$

where,
$A_c$ is a heater cross-sectional area,
$A_s$ is a sheath area,
C is a constant based on Reynolds number,
$C_2$ is an offset based on the number of heater elements in the at least one electric heater,
$C_p$ is a specific heat of air at constant pressure,
D is a heater element diameter,
K is a thermal conductivity of air,
$M_{fuel}$ is a mass flow rate of fuel,
$M_{in}$ is an inlet mass air flow (MAF) rate,
m is a constant based on Reynolds number,
$\dot{m}$ is a mass flow rate,
Pr is a Prandtl number of air taken at gas temperature,
$Pr_s$ is a Prandtl number of air taken at sheath temperature,
$S_T$ is a transverse distance between heater elements,
$T_{in}$ is a heater inlet temperature,
$T_{out}$ is a heater outlet temperature, and
μ is a viscosity of air.

14. A heating system for a fluid flow system, the heating system comprising:
at least one electric heater disposed within a fluid flow pathway; and
a control device including a microprocessor and configured to receive at least one fluid flow system input and at least one heater input, the at least one fluid flow system input including a mass flow rate of the fluid flow system, a fluid inlet temperature, an outlet temperature, or combination thereof, the at least one heater input includes at least one physical characteristic of the heating system, wherein the at least one physical characteristic includes a resistance wire diameter, a heater insulation thickness, a heater sheath thickness, conductivity, a specific heat and density of the material of the heater, an emissivity of the heater and the fluid flow pathway, or combinations thereof;
wherein the control device is configured to determine a temperature of the at least one electric heater based on a model, the at least one fluid flow system input, and the at least one heater input, wherein the control device is configured to provide power to the at least one electric heater based on the temperature of the at least one electric heater.

15. The heating system according to claim 14, wherein the temperature of the at least one electric heater is a sheath temperature, and wherein the control device is configured to determine the sheath temperature based on the following equation:

$$T_s = T_{out} + \frac{\left(\frac{kW}{A_s}\right)}{\frac{K}{D}\left\{C_2 \cdot C \cdot Pr^{0.36}\left(\frac{Pr}{Pr_s}\right)^{0.25} \left[\frac{D}{\mu}\left(\frac{S_T}{S_T - D}\right)\left(\frac{M_{in} + M_{fuel}}{A_c}\right)\right]^m\right\}}$$

where:
$A_c$ is a heater cross-sectional area,
$A_s$ is sheath area,
C is a first constant based on Reynolds number,
$C_2$ is an offset based on the number of heater elements in the at least one electric heater,
D is a heater element diameter,
K is a thermal conductivity of air,
kW is a total heater power,
$M_{fuel}$ is a mass flow rate of fuel,
$M_{in}$ is an inlet mass air flow rate,
m is a second constant based on Reynolds number,
Pr is a Prandtl number of air taken at gas temperature,
$Pr_s$ is a Prandtl number of air taken at sheath temperature;
$S_T$ is a transverse distance between heater elements,
$T_{out}$ is a heater outlet temperature, and
μ is a viscosity of air.

16. The heating system according to claim 14, wherein the temperature of the at least one electric heater is a sheath temperature, and wherein the control device is configured to determine the sheath temperature based on the following equation $$T_s = \frac{T_{out} + T_{in}}{2} + \frac{\left(\frac{C_P \cdot \dot{m}(T_{out} + T_{in})}{A_s}\right)}{\frac{K}{D}\left\{C_2 \cdot C \cdot Pr^{0.36}\left(\frac{Pr}{Pr_s}\right)^{0.25} \left[\frac{D}{\mu}\left(\frac{S_T}{S_T - D}\right)\left(\frac{M_{in} + M_{fuel}}{A_c}\right)\right]^m\right\}}$$

where,
$A_c$ is a heater cross-sectional area,
$A_s$ is a sheath area,
C is a constant based on Reynolds number,
$C_2$ is an offset based on the number of heater elements in the at least one electric heater,
$C_p$ is a specific heat of air at constant pressure,
D is a heater element diameter,
K is a thermal conductivity of air,
$M_{fuel}$ is a mass flow rate of fuel,
$M_{in}$ is a inlet mass air flow (MAF) rate,
m is a constant based on Reynolds number,
$\dot{m}$ is a mass flow rate,
Pr is a Prandtl number of air taken at gas temperature,
$Pr_s$ is a Prandtl number of air taken at sheath temperature,
$S_T$ is a transverse distance between heater elements, $T_{in}$ is a heater inlet temperature,
$T_{out}$ is a heater outlet temperature, and
$\mu$ is a viscosity of air.

17. The heating system according to claim 14, wherein the temperature of the at least one electric heater is an outlet temperature, and wherein the control device is configured to determine the outlet temperature based on the following equation $$T_{out,1} = \frac{2 \cdot \dot{m} \cdot C_P \cdot T_{in,1} + h \cdot A_s(2T_s - T_{in,1})}{2 \cdot \dot{m} \cdot C_P + h \cdot A_s}$$

where:
$A_s$ is a sheath surface area;
$C_p$ is a specific heat of air at constant pressure;
h is a convective heat transfer coefficient;
$\dot{m}$ is a mass flow rate;
$T_{out,1}$ is an outlet temperature after a first component;
$T_{in,1}$ is an inlet temperature of the first component; and
$T_S$ is a sheath temperature.

18. The heating system according to claim 14, wherein the at least one electric heater is one of a band heater, a bare wire resistive heating element, a cable heater, a cartridge heater, a layered heater, a strip heater, and a tubular heater.

19. The heating system according to claim 14, wherein the control device is configured to determine the temperature of the at least one electric heater based on the model and at least one further input including at least one of a set point and radiation effects.

20. The control system according to claim 14, wherein the mass flow rate of the fluid flow system is determined based on at least one of a torque demand, a pedal position, a manifold absolute pressure (MAP), a boost timing, an engine timing, a fuel consumption, and an inlet air mass flow rate.

21. The heating system according to claim 14, wherein the at least one physical characteristic further includes heat transfer coefficients.

22. An engine system comprising the heating system according to claim 14.

23. The engine system according to claim 22, wherein the control device is configured to receive engine inputs that include engine parameters, fluid flow parameters, electrical power output, heater parameters, or a combination thereof, and the control device is configured to generate an output that includes a power consumption, a fluid flow temperature, a heater temperature, a diagnostic, or combination thereof.

24. The engine system according to claim 22, wherein the heating system is configured to diagnose degrading engine system components.

25. The engine system according to claim 22, wherein the heating system is in communication with an engine control unit and configured to trigger a diagnostic trouble code when a determined parameter is mismatched with a preset parameter.

26. The heating system according to claim 14, wherein the at least one electric heater includes a resistive heating element.

27. The heating system according to claim 14, wherein the at least one heater input includes a power input to the at least one electric heater.

* * * * *